United States Patent Office 3,153,631
Patented Oct. 20, 1964

3,153,631
LUBRICATING OIL THICKENED TO A GREASE CONSISTENCY WITH A PRODUCT OF AN ARYL ISOCYANATE AND AN AMINE-TREATED SILICA
Paul R. McCarthy, Allison Park, and Chester S. Tempalski, Pittsburgh, Pa., assignors to Gulf Research & Development Company, Pittsburgh, Pa., a corporation of Delaware
No Drawing. Filed Dec. 21, 1961, Ser. No. 161,292
7 Claims. (Cl. 252—28)

This invention relates to an improved lubricating composition and more particularly to a lubricant suitable for high temperature lubrication.

The trend in design of modern aircraft has accentuated the need for greases which will lubricate anti-friction bearings operating at high rotational speeds and high temperatures. Considerable progress has been made in recent years in producing improved aircraft greases. For example, a number of greases are now available for lubricating bearings operating at 10,000 to 20,000 revolutions per minute at temperatures up to about 400° F. However, great difficulty has been encountered in producing a grease which will effectively lubricate bearings operating at speeds of 10,000 to 20,000 revolutions per minute and temperatures of about 400° to about 600° F. for prolonged periods of time. Conventional aircraft greases currently available have failed to meet the stringent requirements on such a lubricant.

We have discovered that a lubricating composition having improved lubricating characteristics for an extended period of time when used to lubricate bearings operating at temperatures up to about 600° F. and speeds of 10,000 to 20,000 revolutions per minute can be obtained by incorporating into a lubricating oil in oil thickening proportions the reaction product of an aryl isocyanate having the formula:

$$R(NCO)_2$$

wherein R is selected from the group consisting of unsubstituted arylene and $C_1$ to $C_4$ alkyl substituted arylene radicals and a finely-divided silica having dispersed on the surface thereof a benzamido arylamine having the formula

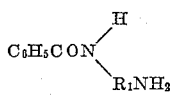

wherein $R_1$ is selected from the group consisting of unsubstituted arylene radicals and arylene radicals substituted with at least one radical selected from the group consisting of halo and $C_1$ to $C_4$ alkyl radicals. Thus, the improved lubricating composition of our invention comprises a dispersion in a lubricating oil of a sufficient amount to thicken the lubricating oil to a grease consistency of the product obtained by reacting an aryl isocyanate and a benzamido arylamine-treated finely-divided silica.

The amount of the product obtained by reacting an aryl isocyanate and a benzamido arylamine-treated finely-divided silica which we use may vary over wide limits depending upon the particular isocyanate employed, the benzamido arylamine used in treating the silica, the particular oil with which the reaction product is blended and the properties desired in the ultimate composition. In any event, the amount of the reaction product used is an amount sufficient to thicken the lubricating oil to a grease consistency. In general, this amount comprises about 10 to about 40 percent by weight of the total composition. The proportion of silica in the reaction mass may vary over wide limits but in most instances comprises about 50 to about 75 percent by weight of the reaction mass. The rest of the reaction mass comprises the aryl isocyanate and the benzamido arylamine, believed to be in the form of an aryl urea. The ratio of the isocyanate (—NCO) groups to the primary amine (—NH₂) groups is about 1 to 1. Since the isocyanate we employ is a diisocyanate and the arylamine contains only one primary amine group, the molar ratio of the aryl diisocyanate to the benzamido arylamine is preferably 1 to 2.

The aryl isocyanate which is employed in accordance with the invention is an arylene diisocyanate having the formula:

$$R(NCO)_2$$

wherein R represents an unsubstituted arylene radical such as phenylene, biphenylene, naphthylene and diphenylmethane radicals, and a $C_1$ to $C_4$ alkyl-substituted arylene radical. Examples of these compounds include 1,4-diisocyanato benzene; 1,3-diisocyanato benzene; 2,4-tolylene diisocyanate; 2,6-tolylene diisocyanate; 3,5-diisocyanato-t-butylbenzene; p,p'-diisocyanate biphenyl; 3,3'-dimethyl-biphenylene-4,4'-diisocyanate; 3,3'-dibutylbiphenylene-4,4'-diisocyanate; naphthylene diisocyanate; diphenylmethane-4,4'-diisocyanate; 3,3'-dimethyldiphenylmethane-4,4'-diisocyanate; and 3,3'-di-t-butyldiphenylmethane-5,5'-diisocyanate. The amount of the aryl isocyanate employed depends to a large extent upon the amount of the benzamido arylamine which is used in treating the finely-divided silica. For example, the aryl isocyanate and the benzamido arylamine are employed in amounts such that the ratio of the isocyanate group to the primary amine group is about 1 to 1.

The benzamido arylamine which is employed in treating the finely-divided silica is a benzamido arylamine having the formula

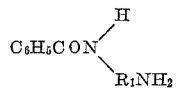

wherein $R_1$ is selected from the group consisting of an unsubstituted arylene radical such as phenylene, biphenylene, naphthylene, etc. and arylene radicals substituted with at least one radical selected from the group consisting of halo and $C_1$ to $C_4$ alkyl radicals. Examples of these compounds include p-Benzamido aniline
4-benzamido-4'-aminobiphenyl
5-benzamido-α-naphthylamine
5-benzamido-β-naphthylamine
2-chloro-4-benzamido aniline
2-bromo-4-benzamido aniline
2-chloro-4-benzamido aniline
2,5-dimethly-4-benzamido aniline
2,5-dichloro-4-benzamido aniline
2-chloro-4-benzamido-5-t-butylaniline
2,6-di-t-butyl-4-benzamido aniline The benzamido arylamine is employed in amounts corresponding to about 25 to about 50 percent by weight based on the weight of the untreated silica.

The finely-divided silica which is employed in accordance with this invention is not to be confused with silica gels, silica aerogels, or other precipitated silicas. The silica which we employ is a finely-divided amorphous silica. The most common process for manufacturing a finely-divided silica useful in the composition of our invention is by the high-temperature, vapor-phase hydrolysis of silicon tetrachloride. However, a suitable finely-divided silica can also be made by the high-temperature, vapor-phase thermal decomposition of silicon compounds such as silicon esters and also the high-temperature, vapor-phase hydrolysis of silicon compounds with superheated steam, e.g., the steam hydrolysis of silicon esters or silanes. The amount of the finely-divided amorphous silica employed in the composition of the invention may vary over wide limits depending upon the particular lubricating oil with which the silica is blended, the particular benzamido arylamine employed, the particular organophilic siliceous material and upon the characteristics desired in the ultimate composition. In general, the amount of the finely-divided silica comprises about 50 to about 75 percent by weight of the total thickening composition.

In treating the finely-divided silica with the benzamido arylamine, various procedures may be employed. In a preferred embodiment of the invention, the benzamido arylamine is dissolved at room temperature in a suitable organic solvent. Examples of some of the suitable organic solvents are ethyl acetate, acetone, methyl alcohol, ethyl alcohol, ethyl ether, methyl ethyl ketone and nitrobenzene. The finely-divided silica is dispersed in a separate portion of the organic solvent. The benzamido arylamine solution is then added to the dispersion of silica and the mixture is thoroughly agitated at room temperature for about ½ to 2 hours to effect homogenization. The organic solvent is then removed by the use of vacuum and/or the application of heat. When the solvent is removed, the silica has the benzamido arylamine dispersed on its surface. The benzamido arylamine siliceous product thus obtained is then advantageously pulverized to the desired size. According to another embodiment of the invention, a portion of the solvent is removed to give a slurry which is then added to the lubricating oil. After this slurry is admixed with the lubricating oil, the oil mixture is heated to effect removal of the remaining solvent.

The lubricating oil in which the product obtained by reacting an aryl isocyanate and a benzamido arylamine-treated finely-divided silica is incorporated is preferably a lubricant of the type best suited for the particular use for which the ultimate composition is designed. Since many of the properties possessed by the lubricating oil are imparted to the ultimate lubricating composition, we advantageously employ an oil which is thermally stable at the contemplated lubricating temperature. Some mineral oils, especially hydrotreated mineral oils, are sufficiently stable to provide a lubricating base for preparing lubricants to be used under moderately elevated temperatures. In general, however, where temperatures in the order of 400° to 600° F. are encountered, synthetic oils form a preferred class of lubricating bases because of their high thermal stability. The synthetic oil can be an organic ester which has a majority of the properties of a hydrocarbon oil of lubricating grade such as di-2-ethylhexyl sebacate, dioctyl phthalate and dioctyl azelate. Instead of an organic ester, we can use polymerized olefins, copolymers of alkylene glycols and alkylene oxides, polyorgano siloxanes, polyaryl ethers and the like.

The liquid polyorgano siloxanes and certain polyaryl ethers because of their exceedingly high thermal stability form a preferred group of synthetic oils to which the aryl isocyanate-benzamido aryl amine-treated finely-divided silica product is added. The polyorgano siloxanes are known commercially as silicones and are made up of silicon and oxygen atoms wherein the silicon atoms may be substituted with alkyl, aryl, alkaryl, aralkyl and cycloalkyl radicals. Exemplary of such compounds are the dimethyl silicone polymers, diethyl silicone polymers, ethyl-phenyl silicone polymers and methyl-phenyl silicone polymers. Exemplary of an exceedingly good polyaryl ether is a polyphenyl ether, i.e., m-bis(m-phenoxyphenoxy)benzene.

If desired, a blend of oils of suitable viscosity may be employed as the lubricating oil base instead of a single oil by means of which any desired viscosity may be secured. Therefore, depending upon the particular use for which the ultimate composition is designed, the lubricating oil base may be a mineral oil, a synthetic oil, or a mixture of mineral and/or synthetic oils. The lubricating oil content of the compositions prepared according to this invention comprises about 60 to about 90 percent by weight of the total composition.

The oil thickening composition employed in accordance with the present invention is obtained by reacting an aryl isocyanate as defined hereinabove and the benzamido aryl amine-treated finely-divided silica. It is preferred to react these materials in a molar ratio such that there is about one isocyanate group available per primary amine group present in the treated silica. The oil thickening composition can be prepared either separately and then dispersed in the lubricating oil or in situ by dispersing the aryl isocyanate and the amine-treated silica in a portion or all of the lubricating oil.

In compounding the compositions of the present invention, various mixing and blending procedures may be used. According to one embodiment of the invention, the aryl isocyanate is dispersed in about one half of the lubricating oil at about 150° to about 400° F. The amine-treated silica is dispersed in the other half of the lubricating oil at about 150° to about 400° F. The oils containing the isocyanate and the amine-treated silica respectively are then pumped simultaneously through a Premier Colloid Mill set at a stator-rotor clearance of 0.002 inch. Mixing and reaction of the isocyanate with the amine-treated silica occurs in the mill whereupon a grease of desired consistency is obtained. According to another embodiment of the invention, the aryl isocyanate is dispersed in all of the lubricating oil at a temperature of about 150° to about 400° F. The amine-treated silica is then admixed with the dispersion while continuing to heat the mixture for another 10 to 30 minutes. During this mixing period some thickening is evidenced. Some lumps may be formed. The slurry thus formed is then cooled to about room temperature. If desired, conventional lubricant additives are then added to the cooled slurry while stirring is continued. The cooled mixture thus formed is then passed twice, by means of a pump, through a Premier Colloid Mill set at a stator-rotor clearance of 0.002 inch. Maximum thickening occurs on the second pass through the mill.

The lubricating composition of this invention can contain conventional lubricant additives, if desired, to improve other specific properties of the lubricant without departing from the scope of the invention. Thus, the lubricating composition can contain a filler, a corrosion and rust inhibitor, an extreme pressure agent, an anti-oxidant, a metal deactivator, a dye, and the like. Whether or not such additives are employed and the amounts thereof depend to a large extent upon the severity of the conditions to which the composition is subjected and upon the stability of the lubricating oil base in the first instance. Since the polyorgano siloxanes, for example, are in general more stable than mineral oils, they require the addition of very little, if any, oxidation inhibitor. When such conventional additives are used they are generally added in amounts between about 0.01 and 5 percent by weight based on the weight of the total composition.

In order to illustrate the improved lubricating characteristics of a grease composition of the invention when used to lubricate a bearing operating at 600° F. and rotational speeds of 10,000 revolutions per minute, a slight modification of the test procedure outlined by the Coordinating Research Council Tentative Draft (July 1954), "Research Technique for the Determination of Performance Characteristics of Lubricating Grease in Antifriction Bearings at Elevated Temperatures," CRC Designation L-35 was used. In the present evaluation, about 6 to 7 grams of the grease to be tested are placed in a bearing assembly containing an eight-ball SAE No. 204 ball bearing. The bearing assembly which is mounted on a horizontal spindle is subjected to a radial load of 5 pounds. The portion of the spindle upon which the test bearing assembly is located is encased in a thermostatically controlled oven. By this means the temperature of the bearing can be maintained at a desired elevated temperature which in the tests reported hereinafter was 600° F. The spindle is driven by a constant belt-tension motor drive assembly, capable of giving spindle speeds up to 20,000 revolutions per minute. The spindle is operated on a cycling schedule consisting of a series of periods, each period consisting of 20 hours' running time and 4 hours' shutdown time. The test continues until the lubricant fails. The lubricant is considered to have failed when any one of the following conditions occurs, (1) spindle input power increases to a value approximately 300 percent above the steady state condition at the test temperature; (2) an increase in temperature at the test bearing of 20° F. over the test temperature during any portion of a cycle; or (3) the test bearing locks or the drive belt slips at the start or during the test cycle.

The oil used in preparing the lubricating composition shown in Table I was a synthetic oil known as QF–6–7024 Fluid marketed by Dow-Corning Corporation. This fluid is considered to be a methylphenylsiloxane polymer wherein the "end" silicon atoms are substituted to a high degree by two phenyl groups and one methyl group. The material is highly resistant to radiation.

The silica employed in preparing the lubricating composition shown in Table I was a finely divided amorphous silica marketed by Godfrey L. Cabot, Inc., under the proprietary name of Cab-O-Sil. This silica is a submicroscopic particulate silica prepared in a hot gaseous environment (1100° C.) by the vapor-phase hydrolysis of a silicon compound. On a moisture-free basis, this silica is 99.0 to 99.7 percent silicon dioxide which is practically free from contaminating metallic salts. Gravimetric analyses fail to detect the presence of any calcium or magnesium. The iron content has been found to be about 0.004 percent and volatile matter removed on ignition at 1000° C. amounts to less than 1 percent. Cab-O-Sil is an extremely fine silica with particles ranging in size from 0.015 to 0.020 micron.

In preparing the amine-treated silica for use in an illustrative composition of the invention (Composition C), 60 grams of finely-divided silica (Cab-O-Sil) were dispersed in approximately one liter of methyl ethyl ketone. Twenty grams of 2-chloro-4-benzamido-5-methyl-aniline were dissolved in 600 cc. of methyl ethyl ketone. The amine solution was added to the dispersion of silica and the mixture stirred at room temperature for two hours. The methyl ethyl ketone was stripped from the mass under vacuum and the amine-treated silica was then stored in a desiccator under vacuum until dry. The amine-treated silica was then pulverized to pass through a No. 50 U.S. Standard Sieve.

In preparing the illustrative lubricating composition of the invention (Composition C), 1.56 parts of 3,3'-dimethylbiphenylene-4,4'-diisocyanate were added to 85 parts of the lubricating oil (Dow Corning silicone QF–6–7024) and the mixture heated with stirring at 300° F. To the heated mixture were added 13.44 parts of the amine-treated silica while continuing to stir and to heat at 300° F. for an additional 10 minutes. The mixture was then milled twice in a Premier Colloid Mill set at a stator-rotor clearance of 0.002 inch.

Comparative compositions (Compositions A and B) were prepared by a procedure similar to that used for preparing Composition C. In Composition A, the silica had not been treated with an amine. In Composition B, the silica was treated with the amine, but no aryl isocyanate was employed. The composition of the invention (Composition C) and the comparative compositions (Compositions A and B) thus prepared had the following approximate make-up and properties.

Table I

| Composition, Percent By Weight | A | B | C |
|---|---|---|---|
| Lubricating Oil QF–6–7024 | 90 | 86.76 | 85.00 |
| Cab-O-Sil | 10 | | |
| Amine-treated Cab-O-Sil | | 13.24 | 13.44 |
| 3,3'-Dimethylbiphenylene-4,4'-diisocyanate | | | 1.56 |
| Inspection: | | | |
| Dropping Point, °F | 900+ | 900+ | 900+ |
| Penetration, (ASTM D1403)— | | | |
| Unworked | 269 | 306 | 302 |
| Worked | 298 | 328 | 332 |
| Performance Life, hrs., 10,000 r.p.m. at 600° F | 44 | 14 | 77 |

The improved performance life of the composition of the invention (Composition C) at a high rotational speed and a high temperature is self-evident from the above data.

Other lubricating compositions within the scope of the invention are illustrated in Table II. G.E. Silicone 81717 is marketed by General Electric Company and is a water-white to amber liquid polymer of the general formula

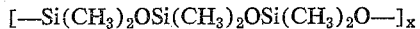

$$[-Si(CH_3)_2OSi(CH_3)_2OSi(CH_3)_2O-]_x$$

It has a viscosity at −65° F. of 3487 centistokes, at 0° F. of 390 centistokes, at 100° F. of 71.3 centistokes, at 210° F. of 22 centistokes and at 700° F. of 1.9 centistokes. DC 550 Fluid is marketed by Dow-Corning Corporation and is a methylphenylsiloxane polymer having as typical characteristics a viscosity at 100° F. of 300 to 400 SUS, a viscosity-temperature coefficient of 0.75, a freezing point of −54° F. a flash point of 600° F. and a specific gravity 25° C./25° C. of 1.08

Table II

| Composition, Percent By Weight | D | E | F | G | H | I |
|---|---|---|---|---|---|---|
| DC 550 Fluid | 88.4 | 84 | | | | |
| G. E. Silicone 81717 | | | 78.5 | 85.4 | | |
| Di-2-ethylhexyl sebacate | | | | | 84.8 | 83.8 |
| Aryl Isocyanate: | | | | | | |
|   1,4-Diisocyanato benzene | | | 1.5 | | | 1.2 |
|   2,6-Tolylene diisocyanate | | 1.0 | | | 1.2 | |
|   3,3'-Dimethylbiphenylene-4,4'-diisocyanate | 1.6 | | | 1.6 | | |
| Finely-Divided Silica: | | | | | | |
|   Cab-O-Sil treated with— | | | | | | |
|     p-Benzamido aniline (2.5 parts by weight) | [1]10 | | | | | |
|     4-Benzamido-4'-amino-biphenyl (3.0 parts by weight) | | [1]15 | | | | |
|     5-Benzamido-α-naphthylamine (5.0 parts by weight) | | | [1]20 | | | |
|     2-Chloro-4-benzamido aniline (3.0 parts by weight) | | | | [1]13 | | |
|     2-Chloro-4-benzamido-5-t-butylaniline (4.0 parts by weight) | | | | | [1]14 | |
|     2,6-Di-t-butyl-4-benzamido aniline (5.0 parts by weight) | | | | | | [1]15 |
| Molecular ratio of aryl isocyanate to benzamido arylamine | 1:2 | 1:2 | 1:2 | 1:2 | 1:2 | 1:2 |

[1] This amount includes the weight of the Cab-O-Sil and the benzamido  arylamine.

While our invention has been described with reference to various specific examples and embodiments, it will be understood that the invention is not limited to such examples and embodiments and may be variously practiced within the scope of the claims hereinafter made.

We claim:
1. A lubricating composition comprising a dispersion in a lubricating oil of a sufficient amount to thicken the lubricating oil to a grease consistency of the reaction product of an aryl isocyanate having the formula:

$$R(NCO)_2$$

wherein R is selected from the group consisting of unsubstituted arylene and $C_1$ to $C_4$ alkyl substituted arylene radicals and a finely-divided silica having dispersed on the surface thereof a benzamido arylamine having the formula:

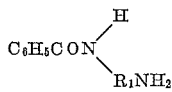

wherein $R_1$ is selected from the group consisting of unsubstituted arylene radicals and arylene radicals substituted with at least one radical selected from the group consisting of halo and $C_1$ to $C_4$ alkyl radicals, and wherein said reaction product is prepared by reacting the aryl isocyanate and the benzamido arylamine-treated silica at a temperature of about 150° to about 400° F. in amounts such that the ratio of the isocyanate groups to the primary amine groups is about 1 to 1.

2. The lubricating composition of claim 1 wherein said reaction product comprises about 10 to about 40 percent by weight of the total composition.

3. The lubricating composition of claim 1 wherein the lubricating oil is a polyorgano siloxane.

4. A lubricating composition comprising a dispersion in a lubricating oil of a sufficient amount to thicken the lubricating oil to a grease consistency of the product obtained by reacting at a temperature of about 150° to about 400° F. 3,3'-dimethylbiphenylene-4,4'-diisocyanate and a finely-divided silica having 2-chloro-4-benzamido-5-methylaniline dispersed on the surface of said silica, wherein the molar ratio of the 3,3'-dimethylbiphenylene-4,4'-diisocyanate to the 2-chloro-4-benzamido-5-methylaniline is about 1 to 2.

5. The lubricating composition of claim 4 wherein the lubricating oil is a polyorgano siloxane.

6. A lubricating composition comprising a lubricating oil thickened with about 10 to about 40 percent by weight of a thickening composition comprising the product obtained by reacting at a temperature of about 150° to about 400° F. an aryl isocyanate having the formula:

$$R(NCO)_2$$

wherein R is selected from the group consisting of unsubstituted arylene and $C_1$ to $C_4$ alkyl substituted arylene radicals and a finely-divided silica having dispersed on the surface thereof a benzamido arylamine having the formula:

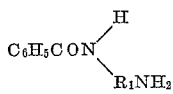

wherein $R_1$ is selected from the group consisting of unsubstituted arylene radicals and arylene radicals substituted with at least one radical selected from the group consisting of halo and $C_1$ to $C_4$ alkyl radicals, wherein the finely-divided silica comprises about 50 to about 75 percent by weight of the thickening composition, the benzamido arylamine is present in an amount corresponding to about 25 to about 50 percent by weight based on the weight of the untreated silica and the molar ratio of the aryl isocyanate to the benzamido arylamine is about 1 to 2.

7. A lubricating composition comprising a dispersion in a liquid polyorgano siloxane of a sufficient amount to thicken the polyorgano siloxane to a grease consistency of a thickening composition comprising the product obtained by reacting at a temperature of about 150° to about 400° F. 3,3'-dimethylbiphenylene-4,4'-diisocyanate and a finely-divided silica having 2-chloro-4-benzamido-5-methylaniline dispersed on the surface of said silica, wherein the finely-divided silica comprises about 50 to about 75 percent by weight of the thickening composition, the 2-chloro-4-benzamido-5-methylaniline is present in an amount corresponding to about 25 to about 50 percent by weight based on the weight of the untreated silica and the molar ratio of the 3,3'-dimethylbiphenylene-4,4'-diisocyanate to the 2-chloro-4-benzamido-5-methylaniline is about 1 to 2.

References Cited in the file of this patent

UNITED STATES PATENTS

| | | |
|---|---|---|
| 2,623,853 | Stross | Dec. 30, 1952 |
| 2,629,691 | Peterson | Feb. 24, 1953 |
| 2,739,121 | Weihe et al. | Mar. 20, 1956 |

FOREIGN PATENTS

| | | |
|---|---|---|
| 713,409 | Great Britain | Aug. 11, 1954 |
| 820,548 | Great Britain | Sept. 23, 1959 |

UNITED STATES PATENT OFFICE
CERTIFICATE OF CORRECTION

Patent No. 3,153,631

October 20, 1964

Paul R. McCarthy et al.

It is hereby certified that error appears in the above numbered patent requiring correction and that the said Letters Patent should read as corrected below.

Column 2, line 52, for "2-chloro-4-benzamido aniline" read -- 2-chloro-4-benzamido-5-methylaniline --.

Signed and sealed this 2nd day of February 1965.

(SEAL)
Attest:

ERNEST W. SWIDER
Attesting Officer

EDWARD J. BRENNER
Commissioner of Patents